United States Patent
Morland

(10) Patent No.: US 8,506,220 B2
(45) Date of Patent: Aug. 13, 2013

(54) SECURING LOADS ON VEHICLES

(75) Inventor: Anthony Morland, Poole (GB)

(73) Assignee: Express Hire (Dorset) Limited (GB)

( * ) Notice: Subject to any disclaimer, the term of this patent is extended or adjusted under 35 U.S.C. 154(b) by 269 days.

(21) Appl. No.: 12/642,980

(22) Filed: Dec. 21, 2009

(65) Prior Publication Data
US 2010/0158629 A1  Jun. 24, 2010

(51) Int. Cl.
*B60P 7/00*  (2006.01)
(52) U.S. Cl.
USPC .............. 410/96; 410/100; 410/156; 340/440
(58) Field of Classification Search
USPC ................. 410/34, 96, 97, 12, 100, 156, 103; 340/431, 438, 440, 686.1, 687; 200/61.18
See application file for complete search history.

(56) References Cited

U.S. PATENT DOCUMENTS

| | | | |
|---|---|---|---|
| 4,027,130 A * | 5/1977 | Filip | |
| 7,112,023 B1 * | 9/2006 | Tardif | 410/96 |
| 2005/0071052 A1 * | 3/2005 | Coletrane et al. | |
| 2006/0277726 A1 | 12/2006 | Hsieh | |
| 2007/0269285 A1 * | 11/2007 | Leggett | 410/100 |

FOREIGN PATENT DOCUMENTS

| | | |
|---|---|---|
| CA | 2377296 A1 | 8/2003 |
| DE | 102007016875 A1 | 1/2008 |
| GB | 1416223 A | 12/1975 |
| WO | 2005/110810 A1 | 11/2005 |

OTHER PUBLICATIONS

EPO Search Report, Mar. 18, 2010.

\* cited by examiner

*Primary Examiner* — Stephen Gordon
(74) *Attorney, Agent, or Firm* — Symbus Law Group, LLC; Clifford D. Hyra

(57) ABSTRACT

A sensing device 26 is attached to a tensioned strap 20 holding a load on a vehicle. A probe 44 engages the strap 20 and causes a signal lamp 28 to light up if the tension in the strap 20 is below a predetermined threshold value. The sensing device 26 helps the vehicle operator to set the tension correctly before a journey and also provides a visible warning if a strap becomes loose during the journey. The warning is visible beyond the vehicle, to alert other road users to a possible hazard.

20 Claims, 3 Drawing Sheets

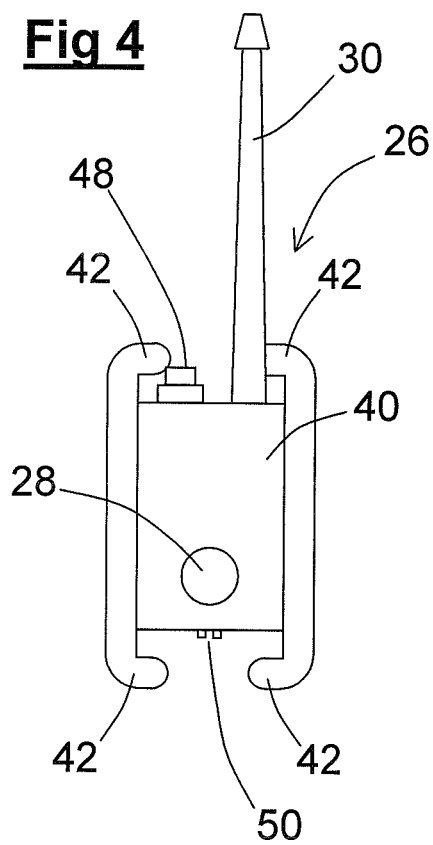
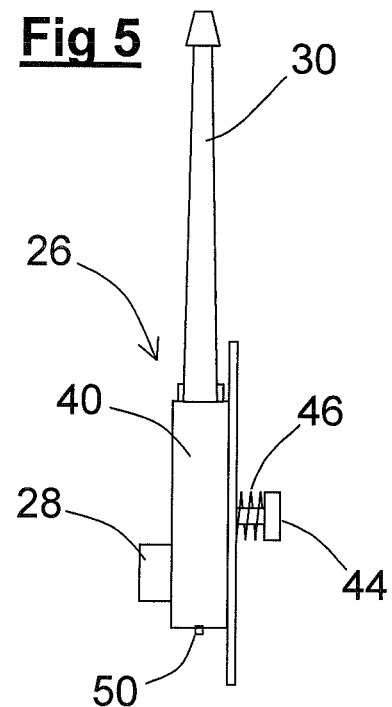
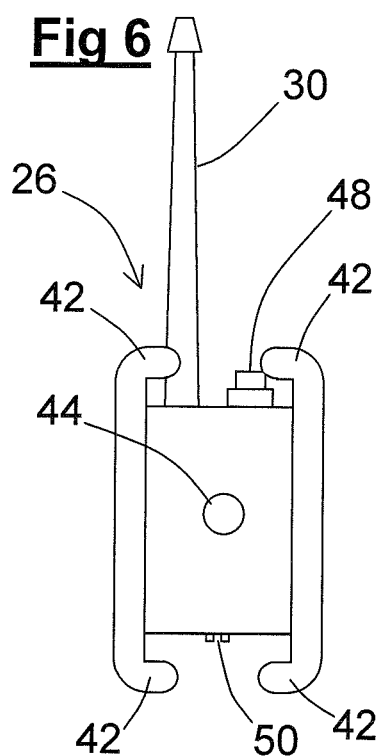
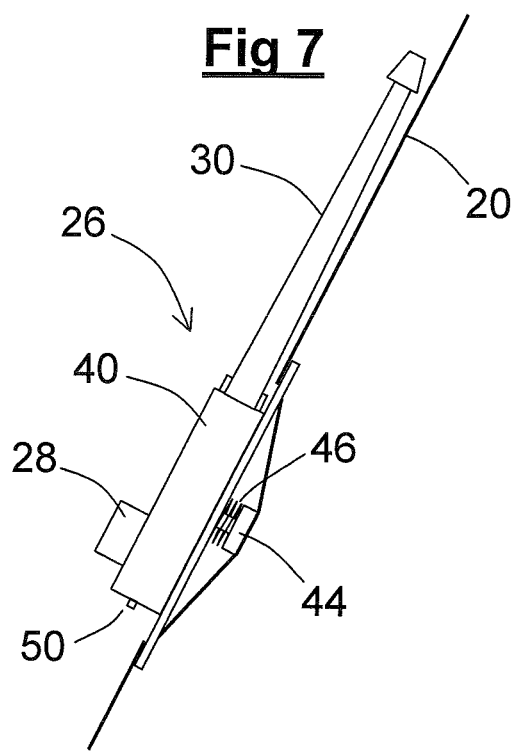

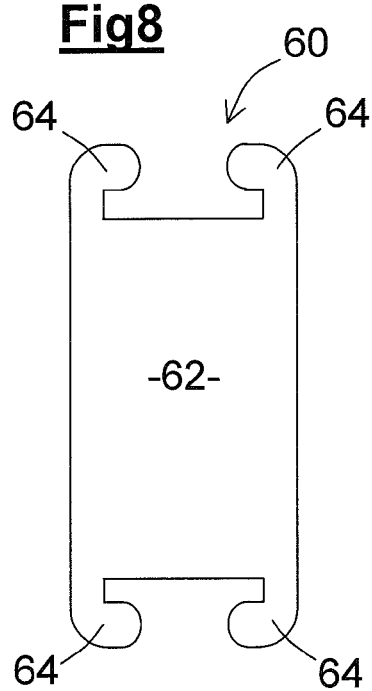
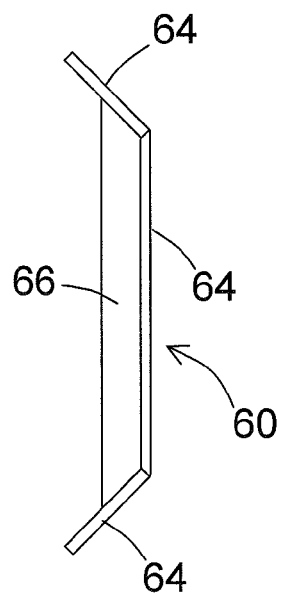
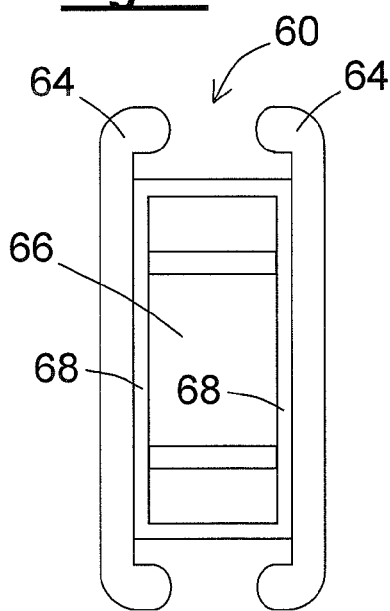
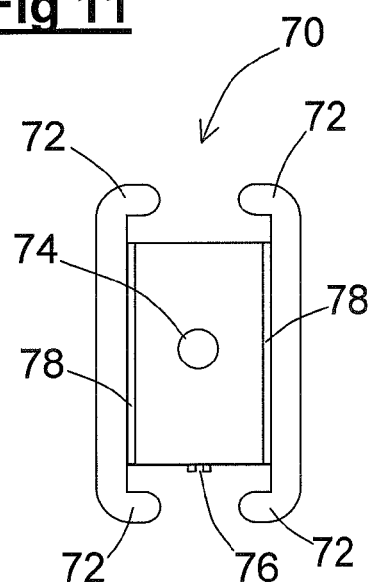
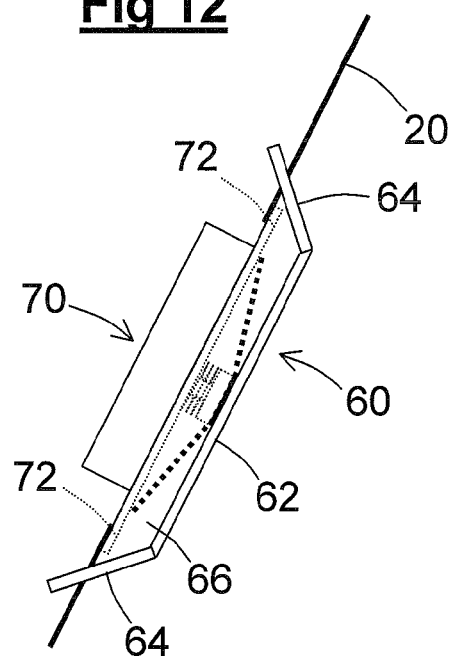

SECURING LOADS ON VEHICLES

CROSS REFERENCE TO RELATED APPLICATIONS

This application claims priority from United Kingdom Patent Application No. 08 23 299.3, filed 22 Dec. 2008, the whole contents of which are incorporated herein by reference in their entirety.

BACKGROUND OF THE INVENTION

1. Field of the Invention

This invention is to do with securing loads on vehicles.

2. Description of the Related Art

The invention is particularly but not exclusively applicable to delivery of construction equipment or other plant to site by truck. In such usage it is clearly essential that the load be secured to the truck, and this is conventionally done by means of tackle comprising a plurality of straps or chains connected to a load platform or other part of the truck and tensioned over the load. Unfortunately such securing arrangements fail from time to time, and accidents occur, most dangerously when a load falls from a truck moving at speed along a road.

There are two main reasons for failures of the securing arrangements. First, the tackle may not be tensioned to the correct level when the truck is being loaded, before it moves off. Regulations generally require straps and other tethers to carry tags showing breaking strength and safe working load, but even where these figures are known operators may not have a ready means of adjusting the tension accordingly; and if one tether of a plurality is incorrectly adjusted it may adversely affect others. Second, a tether may break or otherwise become loose while the truck is in transit with its load, and heretofore in-transit failures of this kind have not been readily noticed by the driver, or indeed by other road users, to provide an opportunity for corrective action.

U.S. Pat. No. 5,295,664 (Kämper), which concerns a winch controlled in response to a tension sensor to keep lashing straps taut during transport, refers to previously known tension measuring aids integrated in the tensioned strap to indicate tension to the operator during the tensioning process, but notes that 'a drop of tension occurring during transport, for instance due to settling of the load, generally remains unnoticed by the operator.'

It is an object of the present invention to enable tension in the tackle to be monitored.

BRIEF SUMMARY OF THE INVENTION

Thus according to a first aspect of the invention there is provided apparatus for holding a load on a vehicle, which apparatus comprises a tether arranged to be secured to the vehicle and applied to the load, tensioning means operable to tension the secured tether into holding engagement with the load, a sensor for monitoring tension in the tether and a signaling device operatively associated with the sensor, wherein the signaling device produces a warning signal when the tension is below a threshold value, wherein said warning signal ceases when the tension reaches the threshold value during operation of the tensioning means and is produced again if the tension subsequently falls below the threshold value.

The warning signal is preferably visual, and the signaling means may comprise a lamp illumination of which provides the warning signal.

Further, the warning signal is preferably visible beyond the vehicle. By this means the signal can be seen by others, such as other road-users, police or regulatory authorities, during transit; and if they see a warning light on the vehicle they will be able to keep clear and/or report the problem.

To help users of the vehicle, the warning signal may also be accompanied by an audible alarm.

The warning signal may be relayed to a telephone, possibly accompanied by information about the vehicle, eg information identifying the vehicle and its location.

Many loads require a plurality of tethers to be applied to hold the load safely, and to this end holding apparatus embodying the invention may comprise a plurality of sensors for respectively monitoring a plurality of said tethers, each sensor having an associated signaling device arranged to produce a warning signal if tension in its respective tether is below a threshold value.

The apparatus may comprise a monitor, possibly located in a cab of the vehicle, configured and arranged to respond to the or each warning signal. The monitor may be configured and arranged to display the replicas of warning signals from a plurality of signaling devices in mutually distinguishable fashion (eg with associated numbers) so that the driver can identify a problem with a particular tether when a warning signal appears. To facilitate this, the signals from the various tethers may be individually encoded for transmission to the monitor.

The or each warning signal may be transmitted to the monitor by wireless transmission, in which case the wireless transmission is preferably variable to avoid interference with other transmissions in the vicinity of the vehicle.

The or each sensor may be embodied in a housing formed to guide a tether into engagement with the sensor, and the housing may be formed for releasable attachment to the tether. The sensor may comprise a probe spring-biased outward of the housing and engageable with the tether, tension in said tether urging the probe back towards the housing against the spring-bias. The housing may be configured and arranged for engagement with a tether in the form of a strap.

The sensor and the signaling device may be electrically powered from a rechargeable battery, which battery may be rechargeable from a power supply of the vehicle or may comprise a solar cell.

To cater for loads of differing size and weight, the threshold value of the or each sensor is preferably adjustable.

The apparatus may comprise a calibration unit operable to calibrate the threshold value for the or each sensor.

The invention extends to a vehicle including the holding apparatus. The vehicle may be a land vehicle, such as a truck, in which case the warning signals may be displayed in a cab of the vehicle to alert the driver. The vehicle may otherwise be a marine vessel, the tackle being used to secure cargo thereof.

In a further aspect the invention comprises a method of holding a load on a vehicle by means of a tether secured to the vehicle, which method comprises applying the tether to the load and tensioning the tether to hold the load on the vehicle, wherein the tension in the tether is monitored while the tether is being tensioned and continuously thereafter during movement of the vehicle.

Preferably in use of this method a warning signal is produced during tensioning of the tether when the tension therein is below a threshold value, the warning signal ceases when tension in the tether reaches the threshold value during said tensioning and the warning signal is produced again if the tension in the tether falls below the threshold value during movement of the vehicle.

The warning signal is preferably a visual signal arranged to be visible beyond the vehicle.

BRIEF DESCRIPTION OF THE SEVERAL VIEWS OF THE DRAWINGS

Other features of the invention will be apparent from the following description, which is made by way of example only and with reference to the accompanying schematic drawings in which

FIGS. 4 to 6 illustrate a sensing device responsive to tension in a tether, being respectively a front elevation, a side elevation and a rear elevation;

FIG. 7 shows the sensing device of FIGS. 4 to 6 applied to a tether.

FIGS. 8 to 10 illustrate a security shield for a sensing device according to the invention, respectively in front elevation, side elevation and rear elevation;

FIG. 11 shows in rear elevation a sensing device according to the invention adapted to cooperate with the security shield of FIGS. 8 to 10; and FIG. 12 shows the sensing device of FIG. 11 and the security shield of FIGS. 8 to 10 cooperatively applied to a tether.

DETAILED DESCRIPTION OF THE PREFERRED EMBODIMENTS

Figure 1:
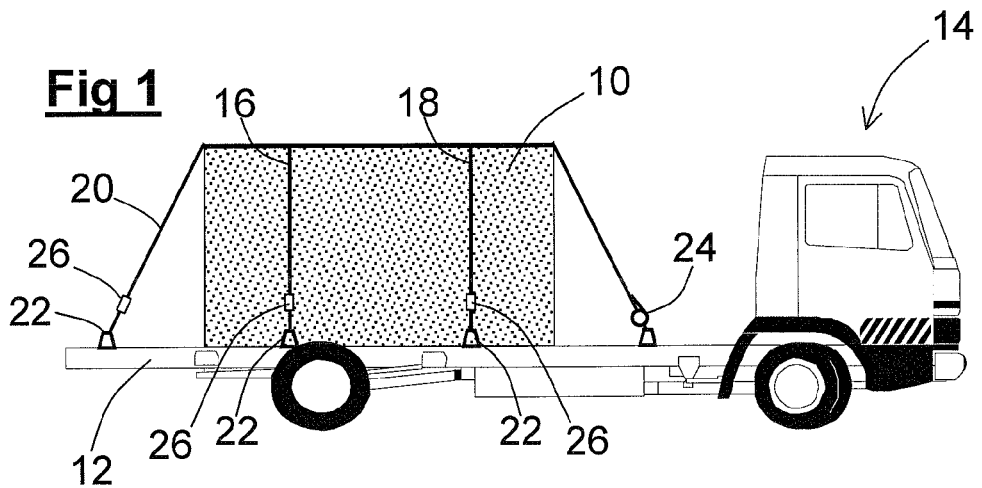
FIG. 1 is a side view of a flat-bed truck carrying a load held thereon in accordance with the invention.

Referring first to FIG. 1, this shows a load 10 carried on the bed 12 of a flat-bed truck indicated at 14. For simplicity of illustration, the load 10 as shown in FIG. 1 is a simple cuboid, but in practice the load may have any of a wide range of shapes and sizes—it may for instance comprise a block of stone or a machine tool or earth-moving equipment. Further, the vehicle used to transport the load may be something other than the flat-bed truck illustrated in FIG. 1.

The one common feature amongst this variety is that the load needs to be held securely on the vehicle. This is done by means of tethers—typically straps but possibly chains or of other form—secured to the vehicle and tensioned across the load. Thus, referring to FIG. 1, the load 10 is held on the truck 14 by two transverse straps 16 and 18 and a longitudinal strap 20, all these straps being hooked on to or otherwise secured to upstands 22 on the bed 12 of the truck 14. Each of the straps 16, 18 and 20 strap is tensioned across the load 10 by means of a ratchet device, which may be of conventional form, that for the longitudinal strap 20 being shown schematically at 24 in FIG. 1. (The transverse straps 16 and 18 are similarly tensioned by respective ratchet devices, but these are not visible in FIG. 1, being on the distal side of the load 10).

Conventionally the operation of ratchet devices to tension holding straps has heretofore involved a somewhat uncertain mixture of skill and guesswork on the part of the operator. A benefit of the present invention is that this uncertainty is removed by providing, on each strap, a sensing device 26. As will be described in more detail hereinafter, each sensing device 26 includes a signal lamp 28 which is lit when tension in the strap is below a threshold value predetermined to be appropriate for holding the load 10 and which ceases to be lit when the tension in the strap exceeds the threshold value. Thus, by means of the invention, the ratchet operator simply operates the ratchet 24 until the signal lamp 28 of the sensing device 26 on the strap 20 goes out, knowing that the tension in that strap is then adequate to hold the load.

The operator performs this ratcheting operation on all the straps, in each case continuing until the respective signal lamps go out. Those skilled in the art will appreciate that tensioning one strap of a plurality may possibly cause some small movement of the load which could result in some relaxation of tension in another strap. If, however, any such relaxation is such that the tension in a particular strap falls below its threshold value, the signal lamp 28 of the sensing device 26 on that strap will light up again, alerting the operator to make an adjustment. This is continued as necessary until all the signal lamps are extinguished.

Figure 2:
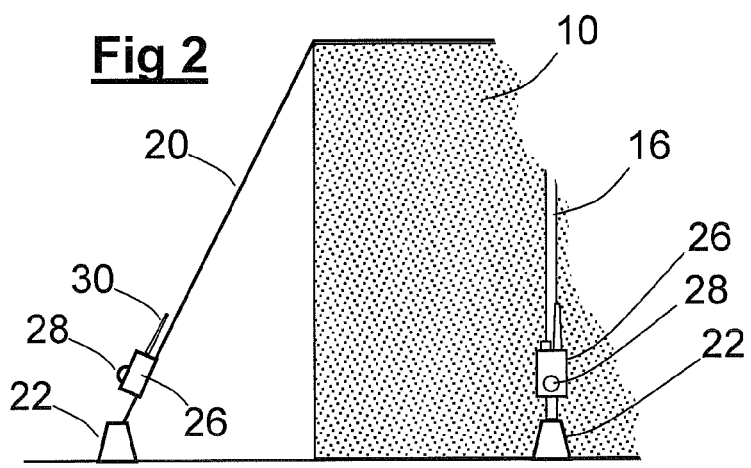
FIG. 2 illustrates, to an enlarged scale, tethers holding the load on the truck of FIG. 1, with sensors monitoring tension in the tethers.

As well as assisting the vehicle operator during the strap tensioning process, the invention also provides a means of monitoring the holding straps while the vehicle is travelling, in two ways, as follows. First, as will be apparent from FIG. 1, each of the sensing devices 26 is arranged to be visible from the rear and/or the side of the truck 14, so that if any strap becomes loose during transportation of the load 10 its signal lamp 28 will light up to give a warning to persons in the vicinity such as other road users or police or other authorities. Second, each sensing device 26 incorporates a radio transmitter which transmits by way of an antenna 30 (FIG. 2) a signal representing the status of its signal lamp 28 to a monitor 32 (FIG. 3) located in the cab of the truck 14 to provide an ongoing status display to the driver.

The monitor 32 receives, by way of a receive antenna 34, the radio signals transmitted from the sensing devices 26 and, if and when tension in a particular strap falls below its threshold value, causes a corresponding one of an array of in-cab liquid crystal display (LCD) lamps to light up to alert the driver of the truck 14 and advise him (eg by the number displayed) which strap has low tension. The monitor 32 is powered from the power supply of the truck 14, by way of a push-button on-off switch 38.

Figure 3:
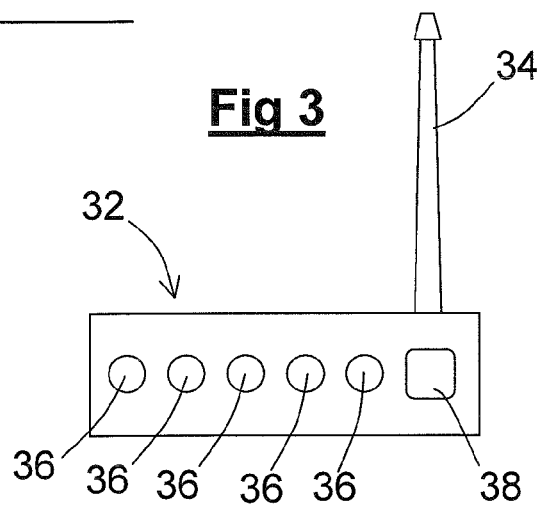
FIG. 3 illustrates a monitor for displaying tension as sensed by the sensors of FIG. 2.

As illustrated in FIG. 3 the monitor 32 has five LCD lamps 36 and is thus configured and arranged to interwork with up to five sensing devices 26. It should be understood, however, that the system may have fewer than five channels (for instance, the load 10 of FIG. 1 is adequately held with only three straps); or it may have more channels (subject to the desirability of avoiding information overload for the driver of the truck 14).

The radio signals for each channel are individually encoded (by well known means which need not be described here) for transmission to the monitor 32, whereby an appropriate individual lamp 36 will light up when tension in a particular strap falls below its threshold value. The driver of the truck 14 will then be able to identify, from the illuminated lamp, which strap needs attention. To assist in this the lamps 36 may be marked to correspond to respective sensing devices 26, eg by numbers or distinctive colours. In addition, the wireless transmission is variable (again by well known means not necessary to describe here) so as to avoid interference with other transmissions in the vicinity of the truck 14.

Referring now to FIGS. 4 to 7, these show the sensing device 26 in more detail. The sensing device 26 comprises a housing 40 formed with wings 42 which provide a guideway for the tethering strap 20 (FIG. 7). The wings 42 are separated laterally by a distance slightly greater than the width of the strap 20, which when not under tension can be bent to fit between the wings 42 and guided into contact with a probe 44 extending rearwardly of the housing 40, as shown in FIG. 7. When the strap 20 is tensioned its engagement within the wings 42 keeps the sensing device 26 attached to the strap 20, and the sensing device 26 can be readily released from the strap 20 when the tension therein is removed.

The probe 44 is urged rearwardly outward of the housing 40 by a spring 46 which is compressed when the strap 20 is tensioned, as shown in FIG. 7. Thus the tensioned strap presses the probe 44 inwards and its movement against the bias of the spring 46 will depend upon the tension in the strap 20.

Within the housing 40 is electrical circuitry. It is not deemed necessary to describe this circuitry in detail here other than to say that it includes a rechargeable battery and is activated by means of a switch 48. When the circuitry is activated it causes the signal lamp 28 to light up, powered from the battery, until tension in the strap 20 is such as to move the 44 inward to a point—corresponding to a predetermined tension—where the lamp 28 is disconnected, and goes out to signal that the threshold value for the tension has been reached. If, subsequently, the tension in the strap 20 falls below the threshold value, the probe 44 moves out under the action of the spring 46, and the lamp 28 lights up again to provide a warning.

The electrical circuitry of the sensing device 26 also includes a radio transmitter responsive to movement of the probe 44 to send radio signals representing the tension in the strap 20 and thereby the status of the lamp 28, and as described above in relation to FIGS. 1 to 3 these radio signals are received by the monitor 32.

The battery of the sensing device 26 is rechargeable from a power supply of the truck 14 and to this end a charging cradle (not shown) may be provided whereby the battery is recharged by way of terminals 50. Alternatively the battery may be a solar cell.

Different loads will call for different tensions in the holding straps (and it may also be noted that regulations generally require the straps to be checked for safe working load and to be marked accordingly). To accommodate such variations, the sensing device 26 can be adjusted eg by screw-thread adjustment (not detailed in the drawings) of the probe 44 or the spring 46. Further, the sensing device 26 is checked at regular intervals and can be recalibrated as necessary by means of such adjustment.

The apparatus and methods described as so far described may be modified in various ways without departing from the scope of the invention. For instance, the signal lamp 28 may be red and be complemented by a green lamp arranged to indicate when tension in a tether is at or above the threshold value. By this means, before a journey, a vehicle operator tensions the tether until the signal changes from red to green. During the journey the signal should stay green, but loss of tension will generate a red signal. The contrast between red and green, and the common knowledge that green means safe and red means danger, may provide an enhanced warning.

The warning signal provided by the signal lamp(s) may be supplemented or possibly replaced by an audible alarm. Further, the warning signal may relayed to a telephone (possibly the driver's mobile telephone or a telephone at a vehicle control centre) to help in dealing with attempted theft of a vehicle load, in which case the relayed warning signal may accompanied by information about the vehicle, eg information identifying the vehicle and its location.

Construction equipment is commonly a target for thieves, especially when of high value. Referring back to FIG. 7 it will be noted that the way in which the sensing device 26 is attached to the strap 20 could allow a would-be thief to jam the probe 44 in an inward position and then cut the strap 20 without activation of the sensing device 26 to issue a warning signal. The arrangement of FIGS. 8 to 12 is designed to guard against this.

The arrangement of FIGS. 8 to 12 includes a security shield 60 comprises a hard steel plate 62 formed at its ends with wings 64 which provide a guideway for a tethering strap 20 (FIG. 12). The wings 64 are separated laterally by a distance slightly greater than the width of the strap 20, which when not under tension can be bent to fit between the wings 64. The security shield 60 also comprises a metal box 66 formed between the wings 64 and providing a laterally separated pair of lengthwise channels 68.

FIG. 11 shows a sensing device 70 with wings 72 for attaching it to a tethering strap 20 and a spring-loaded probe 74 for engaging the strap 20. Although not detailed in FIG. 11, the sensing device 70 is equipped with electronic circuitry including a radio transmitter and it functions in the same way as the sensing device 26 previously described herein, illuminating a signal lamp (not visible in FIG. 11) if tension in a tether to which it is attached falls below a threshold level. However the sensing device 70 is configured and arranged somewhat differently from the sensing device 26, in five respects as follows. First, the sensing device 70 has an enclosed antenna, for improved security. Second, the sensing device 70 has a radio receiver as well as a radio receiver (ie a transceiver) and is arranged for two-way communication with an in-cab monitor such as the monitor 32: if there is a breakdown in communication for a preset period such as 10 s the sensing device is activated to issue a warning signal, whereby a would-be thief is unable to incapacitate the sensing device 70 by shrouding it against radio communication. Third, the sensing device 70 does not require a switch like the switch 48 of the sensing device 26: instead, its electronic circuitry is arranged to detect when the charging terminals 76 engage its charger and switch off the sensing device 70 automatically. (The charger is not shown, but it may be located in-cab and be provided with cradles for a plurality of sensing devices, and those skilled in the art will be readily able to construct such a charger). Fourth, and associated with this last feature, the sensing device 70 is arranged to bleep, after a period of time, if it is neither attached to a tethering strap nor in its charger, to remind vehicle operatives of its presence and help them locate it if mislaid. Finally, the sensing device 70 is formed with two lengthwise ribs 78, one each side of the probe 74, and is otherwise configured and arranged to cooperate with the security shield 60 as will now be described.

In overall length the sensing device 70 is shorter than the security device 60. In use as shown in FIG. 12 the security shield is attached to the strap 20 on the opposite side from the sensing device 70, with its wings 64 flanking the wings 72 of the sensing device 70 and with its box 66 facing the strap. Thus, when the strap 20 is tensioned, the security shield 60 is drawn tight against the sensing device 70 so that the box 66 securely encloses the probe 74. The ribs 78 on the sensing device 70 are configured and arranged to fit into the channels 68 of the box 66, and it is then impossible for a would-be thief to gain access to the probe 74 as long as the strap is tensioned. (If the strap is cut or otherwise loses tension, of course, the sensing device 70 issues a warning signal).

The improved security of the arrangement of FIGS. 8 to 12 makes it especially suitable for the carriage of high value loads, which may include boats and yachts as well as plant and other equipment.

Whilst the invention has been described with reference to the carriage of a load by truck, it will be understood that the invention is not so limited. Thus the invention may otherwise be used, for instance, to secure cargo for transportation by sea.

The invention is also not limited to use with holding straps as described, and it may be adapted for use with chains or other tethering means. Also, to protect the sensing device against possibly deleterious intrusion of dust or damp, O-rings or similar elastic seals may be provided around the stem of the spring-loaded probe.

Other possible modification will be apparent to those skilled in the art.

The invention claimed is:

1. A vehicle for transporting a load by road, which vehicle comprises a cab for a driver of the vehicle and holding apparatus for holding the load on the vehicle during transport of the load, wherein the holding apparatus comprises a tether arranged to be secured to the vehicle and applied to the load, tensioning means operable to tension the secured tether into holding engagement with the load, a sensor for monitoring tension in the tether and a signalling device operatively associated with the sensor and operative to produce a warning signal when the tension is below a threshold value, to cease said warning signal when the tension reaches the threshold value during operation of the tensioning means and to produce said warning signal again if the tension subsequently falls below the threshold value, wherein said warning signal is visual and directed towards both the tensioning means, to be visible thereat by an operator of the tensioning means prior to transport of the load, and the cab of the vehicle, to be visible thereat by the driver of the vehicle during transport of the load.

2. A vehicle for transporting a load by road as claimed in claim 1 wherein the signalling device comprises a lamp, illumination of which provides the warning signal.

3. A vehicle for transporting a load by road as claimed in claim 2 wherein said lamp is red.

4. A vehicle for transporting a load by road as claimed in claim 3 wherein the signalling device comprises a second lamp which is green and illumination of which indicates that the tension is at or above the threshold value.

5. A vehicle for transporting a load by road as claimed in claims 1 wherein said warning signal is also directed towards the road to be visible thereat during transport of the load by users of other vehicles on the road.

6. A vehicle for transporting a load by road as claimed in claim 1 wherein the visual warning signal is accompanied by an audible alarm.

7. A vehicle for transporting a load by road as claimed in claim 1 wherein the warning signal is relayed to a telephone together with information identifying the vehicle and its location.

8. A vehicle for transporting a load by road as claimed in claim 5 comprising further sensors for respectively monitoring tension in further tethers, each of which is associated with one of the further sensors, each further sensor having an associated further signalling device arranged to produce a warning signal when tension in its associated tether is below a threshold value, to cease said warning signal when tension in its associated tether reaches the threshold value during operation of the tensioning means and to produce said warning signal again if tension in its associated tether subsequently falls below the threshold value, wherein all said warning signals are visual and directed towards tensioning means for the further tethers and towards the cab of the vehicle and towards the road.

9. A vehicle for transporting a load by road as claimed in claim 8 comprising a monitor responsive to the warning signals from the signalling devices.

10. A vehicle for transporting a load by road as claimed in claim 9 wherein the monitor includes a display device configured and arranged to display replicas of the warning signals in mutually distinguishable fashion so that a tether in which tension is below the threshold value can be identified from the display device.

11. A vehicle for transporting a load by road as claimed in claim 10 wherein the warning signals are individually encoded for transmission to the monitor.

12. A vehicle for transporting a load by road as claimed in claim 1 wherein the sensor is embodied in a housing formed for releasable attachment to said tether.

13. A vehicle for transporting a load by road as claimed in claim 12 wherein the housing is formed with wings arranged to guide the tether into engagement with the sensor.

14. A vehicle for transporting a load by road as claimed in claim 12 wherein the sensor comprises a probe spring-biased outward of the housing and engageable with the tether, tension in said tether urging the probe back towards the housing against the spring-bias.

15. A vehicle for transporting a load by road as claimed in claim 1 wherein the sensor and the signalling device are electrically powered from a battery rechargeable from a charger connected to a power supply of the vehicle and having a cradle engageable with a housing to effect charging connection with the battery and wherein said apparatus includes means whereby the signalling device is automatically switched off when the housing is engaged with the cradle and automatically switched on when the housing is removed from the cradle.

16. A vehicle for transporting a load by road as claimed in claim 15 including a bleeper automatically activated if the housing is neither in a said cradle nor attached to a said tether for a period of time.

17. A vehicle for transporting a load by road as claimed in claim 12 comprising a security shield cooperative with said housing to shield the sensor.

18. A vehicle for transporting a load by road as claimed claim 17 wherein the security shield is formed for releasable attachment to the tether on an opposite side from said housing, tensioning of the tether drawing the housing and the security shield together.

19. A vehicle for transporting a load by road as claimed in claim 18 wherein the security shield is formed with wings arranged to engage the tether, which wings extend along the tether beyond each end of the housing when the housing and the security shield are drawn together.

20. A vehicle for transporting a load by road as claimed in claim 19 wherein the housing and the security shield are respectively formed with ribs and channels which fit together when the housing and the security shield are drawn together.

* * * * *